(12) United States Patent
Chen

(10) Patent No.: US 9,083,900 B2
(45) Date of Patent: Jul. 14, 2015

(54) LENS SHADING CORRECTION SYSTEM

(71) Applicant: Himax Imaging Limited, Tainan City (TW)

(72) Inventor: Po-Chang Chen, Tainan (TW)

(73) Assignee: Himax Imaging Limited, Tainan (TW)

( * ) Notice: Subject to any disclaimer, the term of this patent is extended or adjusted under 35 U.S.C. 154(b) by 65 days.

(21) Appl. No.: 14/072,737

(22) Filed: Nov. 5, 2013

(65) Prior Publication Data

US 2015/0124128 A1    May 7, 2015

(51) Int. Cl.
*H04N 5/357* (2011.01)
*H04N 5/217* (2011.01)
*H04N 9/04* (2006.01)

(52) U.S. Cl.
CPC ........... *H04N 5/3572* (2013.01); *H04N 5/2173* (2013.01); *H04N 9/045* (2013.01)

(58) Field of Classification Search
CPC .... H04N 5/3572; H04N 5/2173; H04N 9/045
USPC .................................... 348/251, 222.1, 229.1
See application file for complete search history.

(56) References Cited

U.S. PATENT DOCUMENTS

2009/0268053 A1* 10/2009 Wang et al. ................. 348/229.1
2010/0165144 A1*  7/2010 Lee ............................ 348/229.1
2012/0274799 A1* 11/2012 Wang ......................... 348/222.1

* cited by examiner

*Primary Examiner* — Gevell Selby
(74) *Attorney, Agent, or Firm* — Donald E. Stout; Stout, Uxa & Buyan, LLP

(57) ABSTRACT

A lens shading correction (LSC) system includes an illuminant estimator configured to calculate at least one spectral association-measurement of a current frame according to pixel data of an LSC circuit, and then to correlate the at least one calculated spectral association-measurement with spectral association-measurements of a plurality of pre-defined illuminants to determine at least one correlated illuminant. An LSC parameter generator retrieves at least one set of pre-calibrated LSC parameters from a pre-calibrated LSC parameter memory. The LSC parameter generator generates a set of LSC parameters based on the at least one retrieved set of pre-calibrated LSC parameters according to the at least one correlated illuminant.

17 Claims, 8 Drawing Sheets

| R | Invis |
|---|---|
| G | B |

FIG.9B

| R | Invis | R | G |
|---|---|---|---|
| G | B | G | B |
| R | G | R | G |
| G | B | G | B |

FIG.9C

LENS SHADING CORRECTION SYSTEM

BACKGROUND OF THE INVENTION

1. Field of the Invention

The disclosure generally relates to an imaging system, and more particularly to a lens shading correction (LSC) system for an imaging system.

2. Description of Related Art

In an imaging system, lens shading (or vignetting) is a phenomenon that causes pixels located away from a center pixel of a pixel array to have a lower pixel signal value even when all pixels are exposed to the same illumination condition. As a result, brightness of an image can fall off from a center region to corners. In other words, a maximum brightness may be at or around the center and decrease along a radial direction of the pixel array. The lens shading phenomenon may be presented, for example, in the contexts of lens mechanisms, optics, sensor pixels, ray traveling distance, aperture effect and/or ray incident angle to pixels.

Lens shading correction (LSC) is commonly proposed to compensate for the brightness falloff by way of applying different gains, particularly for the pixels away from the center of the pixel array. One drawback of conventional LSC schemes is induced color shading (or color non-uniformity) due to use of a single light source to perform correction. Even when multiple light sources are used, the falloff may correspond not to a monotonic change but rather to an abrupt drop from high color-temperature to low color-temperature light sources. Moreover, metamerism issues may occur, causing confusion in performance of lens shading correction via color temperature because two (or more) light sources may have similar color temperatures but have very different spectra.

For reasons including the fact that conventional LSC schemes have been unable effectively to solve the lens shading phenomenon, a need has arisen to propose a novel LSC system to overcome drawbacks encountered in such conventional LSC schemes.

SUMMARY OF THE INVENTION

In view of the foregoing, it is an object of the embodiment of the present invention to provide a lens shading correction (LSC) system to effectively perform lens shading correction on pixel data while avoiding metamerism issues.

According to one embodiment, a lens shading correction (LSC) system includes an LSC circuit, an illuminant estimator, an LSC parameter generator and a pre-calibrated LSC parameter memory. The LSC circuit is configured to receive input pixel data of a current frame. The illuminant estimator is configured to calculate at least one spectral association-measurement of the current frame according to the input pixel data or output pixel data of the LSC circuit, and then to correlate the at least one calculated spectral association-measurement with spectral association-measurements of a plurality of pre-defined illuminants to determine at least one correlated illuminant. The LSC parameter generator is coupled to receive the at least one correlated illuminant. The LSC parameter generator retrieves at least one set of pre-calibrated LSC parameters from the pre-calibrated LSC parameter memory. The LSC parameter generator generates a set of LSC parameters based on the at least one retrieved set of pre-calibrated LSC parameters according to the at least one correlated illuminant, the generated set of LSC parameters being then forwarded to the LSC circuit to correct pixel data of a succeeding frame.

BRIEF DESCRIPTION OF THE DRAWINGS

FIG. 9B and FIG. 9C exemplify CFAs of FIG. 9A;

DETAILED DESCRIPTION OF THE INVENTION

Figure 1:
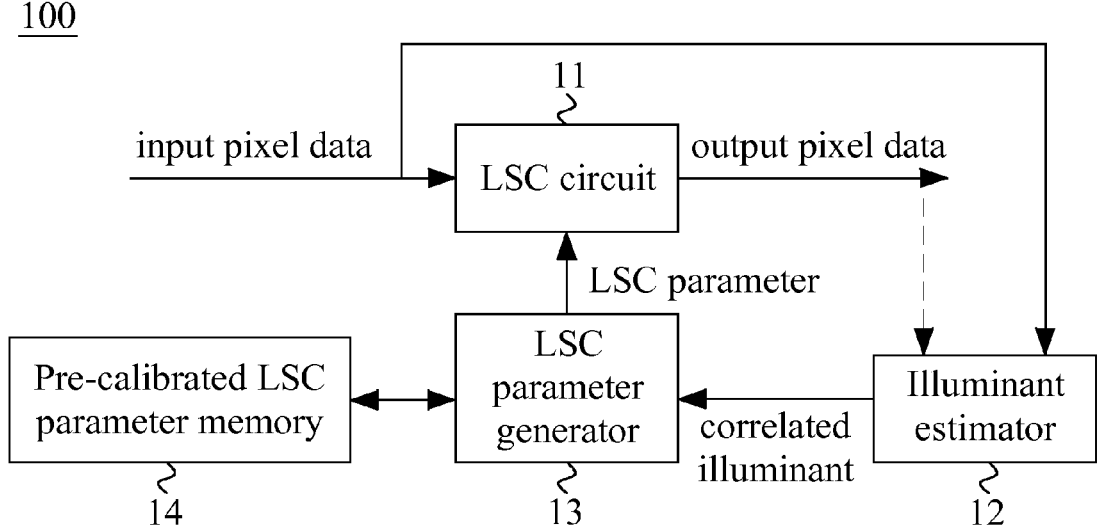
FIG. 1 is a block diagram illustrating a lens shading correction (LSC) system according to one embodiment of the present invention.
Figure 2:
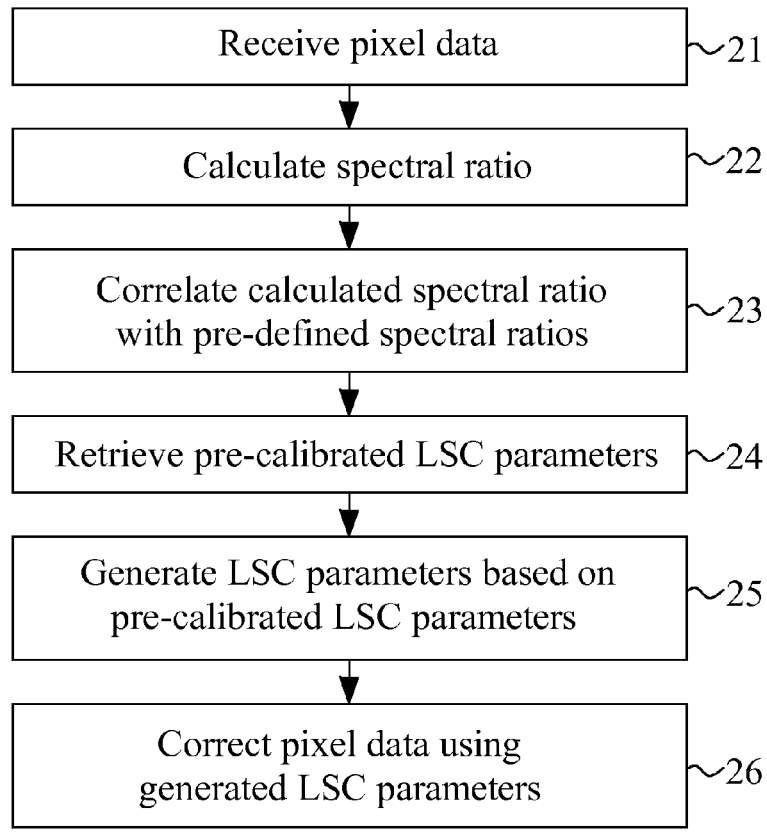
FIG. 2 shows a flow diagram elucidating a lens shading correction (LSC) method according to the embodiment of the present invention.

FIG. 1 shows in block diagram form a lens shading correction (LSC) system 100 according to one embodiment of the present invention, and FIG. 2 is a flow diagram illustrating a lens shading correction (LSC) method 200 according to the embodiment of the present invention. The LSC system 100 and the LSC method 200 may be operated or performed by a processor such as an image signal processor.

Figure 3:
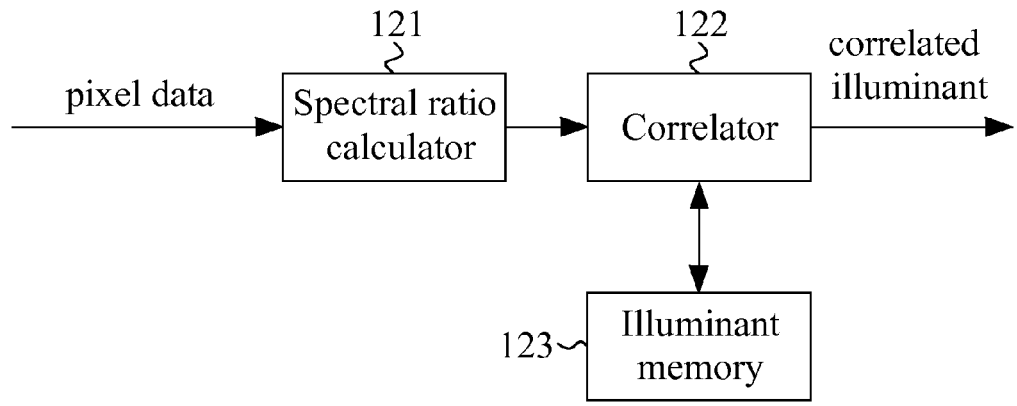
FIG. 3 shows a detailed block diagram of an illuminant estimator of FIG. 1.

The LSC system 100 includes an LSC circuit 11 coupled to receive input pixel data of a current frame (step 21). The LSC system 100 also includes an illuminant estimator 12, a detailed block diagram of which is illustrated in FIG. 3. Specifically, the illuminant estimator 12 may be configured, in step 22, to calculate at least one spectral ratio of the current frame according to the input pixel data, by a spectral ratio calculator 121. Alternatively, the illuminant estimator 12 may calculate the at least one spectral ratio according to output pixel data that are corrected and outputted by the LSC circuit 11, as indicated by a dashed line in FIG. 1. The illuminant estimator 12 may also include a correlator 122 configured, in step 23, to correlate (or compare) the calculated at least one spectral ratio with spectral ratios of plural pre-defined illuminants (stored in an illuminant memory 123) to determine one or more correlated illuminants. In addition to the spectral ratios of pre-defined illuminants, the illuminant memory 123 may store information of pre-defined illuminants. In case that more than one correlated illuminants are determined, correlation weightings (or weightings for short) corresponding to the correlated illuminants may also be obtained (by the correlator 122 of the illuminant estimator 12). In the embodiment, the illuminant may, for example, be referred to a light type and/or a color temperature.

Figure 4:
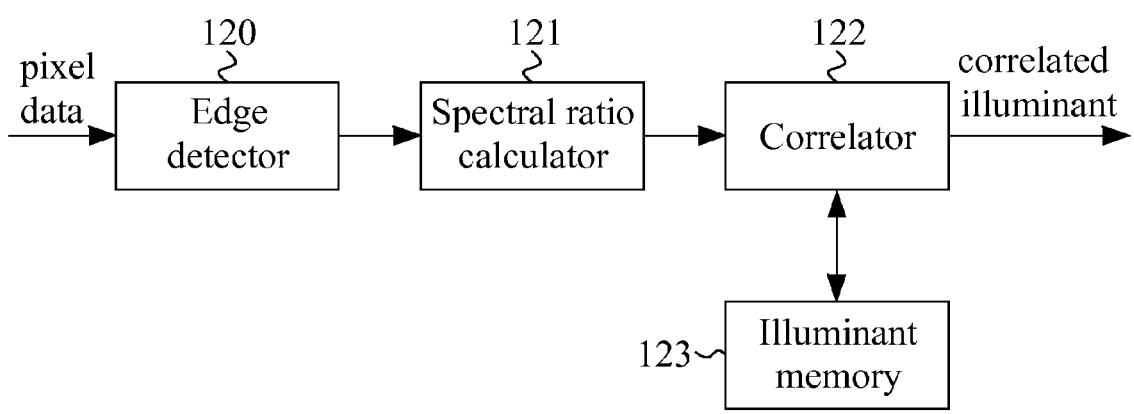
FIG. 4 shows an alternative detailed block diagram of the illuminant estimator of FIG. 1.

FIG. 4 shows an alternative detailed block diagram of the illuminant estimator 12. Compared with FIG. 3, an edge detector 120 is used in FIG. 4 to extract on-edge pixel data, according to which the at least one spectral ratio of the current frame is calculated.

The LSC system 100 may further include an LSC parameter generator 13 (FIG. 1) coupled to receive the at least one correlated illuminant and/or the weightings, e.g., from the illuminant estimator 12, based on that which the LSC parameter generator 13 retrieves of one or more sets of pre-calibrated LSC parameters (step 24) from a pre-calibrated LSC parameter memory 14.

Subsequently, in step 25, the LSC parameter generator 13 generates a set of LSC parameters based on the retrieved set(s) of pre-calibrated LSC parameters according to the correlated illuminant(s). In the case of more than one set of pre-calibrated LSC parameters being retrieved, the sets of pre-calibrated LSC parameters may be blended using the weightings to generate a blended set of LSC parameters as the generated set of LSC parameters; or alternatively, the set of LSC parameters with the highest weighting may be selected as the generated set of LSC parameters. The generated set of LSC parameters is then forwarded to the LSC circuit 11 to correct pixel data, for example, of a succeeding frame (step 26). In this specification, the "succeeding" frame is a frame coming after the current frame, but not necessarily the immediately next frame. For better comprehending the embodiment of the present invention as described above, some specific embodiments are described in details which follow.

Figure 5:
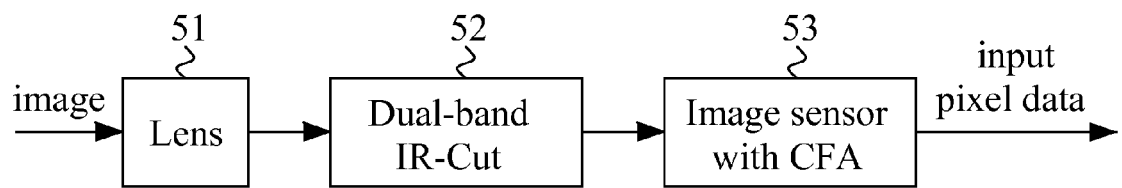
FIG. 5 shows a block diagram illustrating an image sensor apparatus according to a first specific embodiment of the present invention.
Figure 6A:
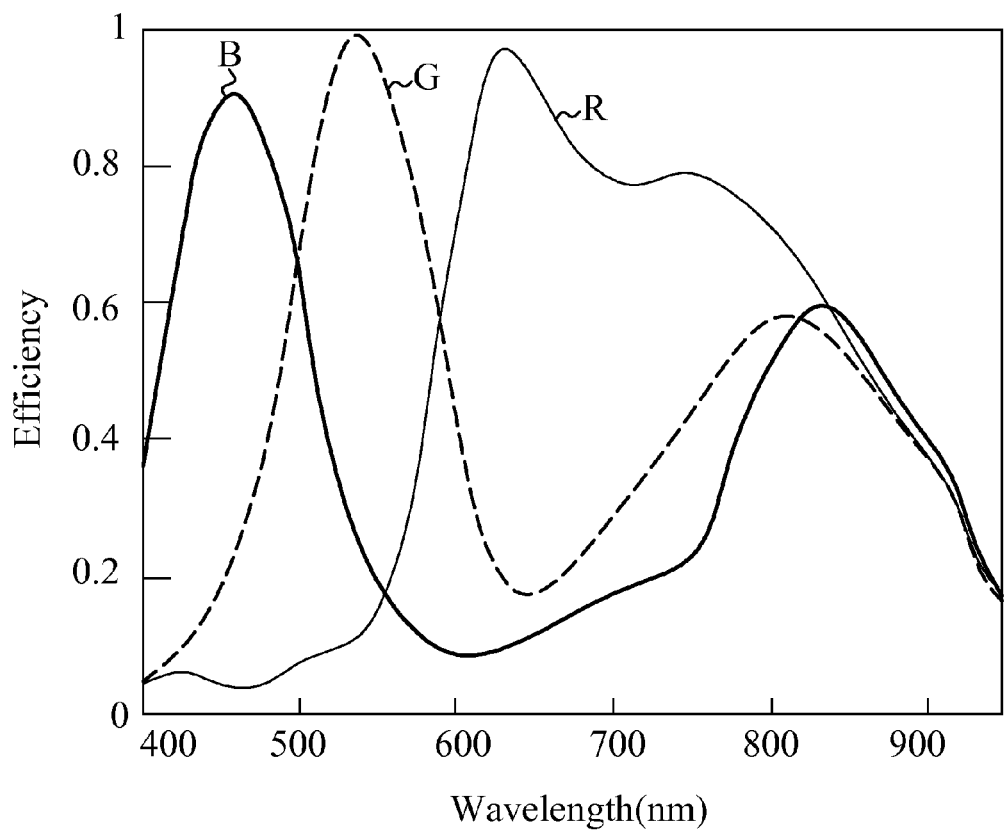
FIG. 6A shows an exemplary spectral response of an image in the first specific embodiment.
Figure 6B:
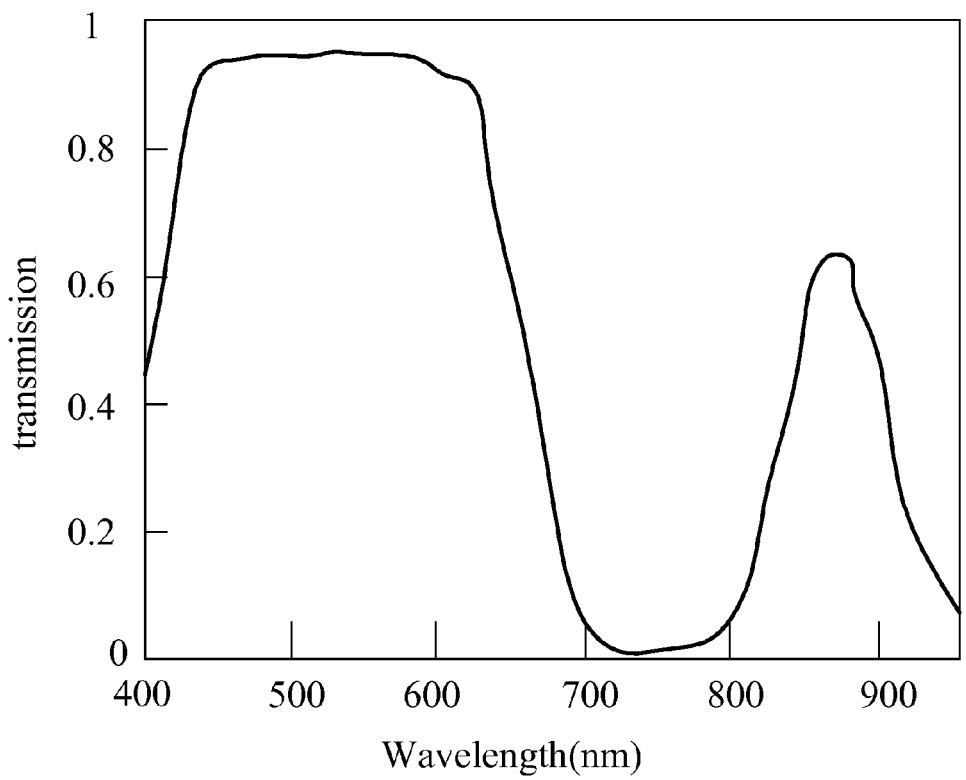
FIG. 6B shows an exemplary transmission spectral response of a dual-band IR-cut device of FIG. 5.

In a first specific embodiment, the input pixel data received by the LSC circuit 11 are provided by an image sensor apparatus 50 illustrated in FIG. 5. Specifically, a lens 51 is used to perform a process of imaging in order to form an image, which may have a spectral response exemplified in FIG. 6A. It is observed that, in general, blue channel (B), green channel (G) and red channel (R) have non-negligible infrared (IR) contents. A dual-band IR-cut device 52 is therefore optionally, but preferably, disposed between the lens 51 and an image sensor 53. The image sensor 53 may, for example, be a charge coupled device (CCD) or a complementary metal oxide semiconductor (CMOS) image sensor. As exemplified in FIG. 6B, the dual-band IR-cut device 52 has two pass bands—a visible band that covers a visible range (e.g., 400-680 nm) and an invisible band (e.g., near-IR or NIR band) that covers an invisible range, e.g., around 850 nm. Accordingly, referring to FIG. 6A and FIG. 6B, the dual-band IR-cut device 52 used in the embodiment may retain IR contents of the B, G and R channels that have substantially the same amplitude while attenuate other IR contents of the B, G and R channels that have different amplitudes. The image sensor 53 of the embodiment may be covered with a color filter array (CFA), for example, of Bayer pattern.

Figure 7:
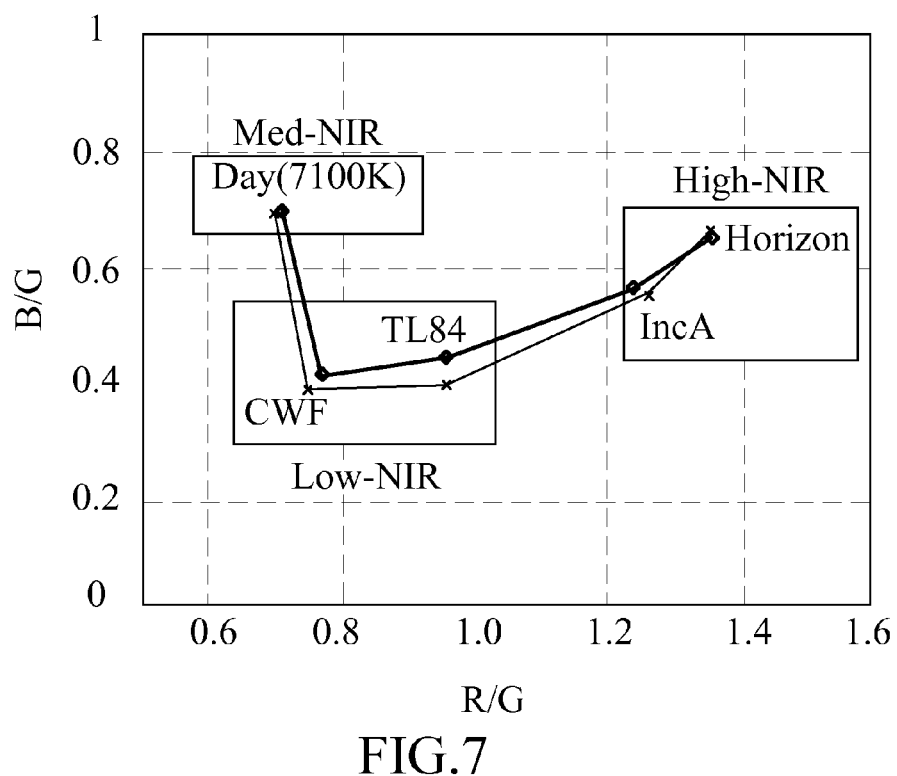
FIG. 7 shows exemplary pre-defined illuminants in the first specific embodiment.

In the embodiment, two spectral ratios are calculated in step 22 (FIG. 2)—R/G color ratio and B/G color ratio. In one exemplary embodiment, the color ratios may be calculated based on grey-world method, in which image of objects are grey on average without illumination. In another exemplary embodiment, the color ratios may be calculated based only on pixel data identified as highly probable to be white. Specifically speaking, in the embodiment, the R/G color ratio is calculated by dividing a mean value of R channel of the current frame by a mean value of G channel of the current frame; and the B/G color ratio is calculated by dividing a mean value of B channel of the current frame by a mean value of G channel of the current frame. The color ratios of the pre-defined illuminants may be similarly calculated beforehand using the same image sensor apparatus 50. FIG. 7 shows exemplary pre-defined illuminants (stored in the illuminant memory 123) identified with R/G and B/G color ratios as their coordinates.

Instead of calculating spectral ratios—R/G color ratio and B/G color ratio—in step 22, spectral differences, for example, R-G color difference and B-G color difference, may be calculated in step 22. Specifically, the R-G color difference is calculated by subtracting a mean value of G channel of the current frame from a mean value of R channel of the current frame; and the B-G color difference is calculated by subtracting a mean value of G channel of the current frame from a mean value of B channel of the current frame. Generally speaking, spectral association-measurements such as the spectral ratios or spectral differences may be calculated in step 22. Although spectral ratios and color ratios are exemplified in the following embodiments and shown figures, it is appreciated that the claimed invention may be generally adapted to other embodiments that use other spectral measurements of association such as spectral differences and color differences.

Figure 8:
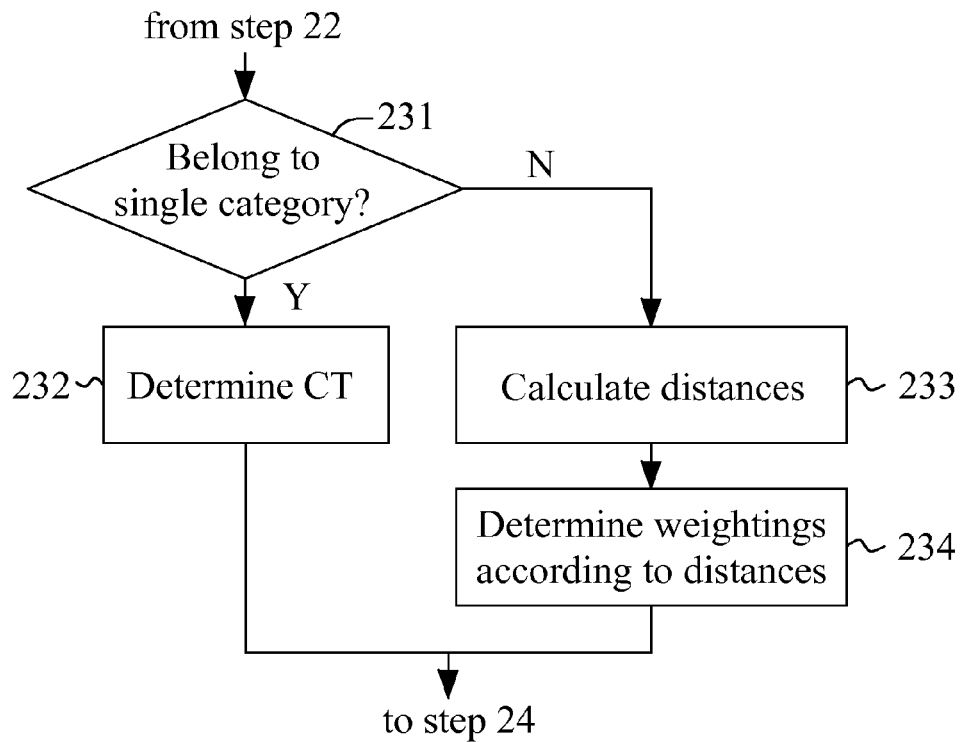
FIG. 8 shows a detailed flow diagram expanding on step 23 of FIG. 2 according to the first specific embodiment.

FIG. 8 shows a detailed flow diagram elucidating step 23 of correlating the calculated color ratios with the pre-defined color ratios. As exemplified in FIG. 7, the pre-defined illuminants may be classified into plural categories (e.g., high-NIR, medium-NIR and low-NIR as shown) according to their closeness in color ratios. In step 231, it is determined whether the calculated color ratios belong to a single category (or whether the to-be-determined illuminant identified with the calculated color ratios is located within a given category). If the result of step 231 is positive, an associated color temperature (CT) is determined in step 232, and the determined color temperature along with a light type (LT) is then received and used by the LSC parameter generator 13 in order to retrieve pre-calibrated LSC parameters from the pre-calibrated LSC parameter memory 14. On the other hand, if the result of step 231 is negative, distances between the to-be-determined illuminant identified with the calculated color ratios and neighboring correlated pre-defined illuminants are calculated (step 233), and the corresponding weightings are then determined according to the calculated distances (step 234). Generally speaking, the shorter the distance is, the larger the weighting is assigned, and vice versa. In the specification, the "neighboring" correlated pre-defined illuminants are illuminants that are distant from the to-be-determined illuminant with a distance less than a predetermined value. The correlated pre-defined illuminates and the corresponding weightings are then received and used by the LSC parameter generator 13 in order to retrieve pre-calibrated LSC parameters from the pre-calibrated LSC parameter memory 14.

In the embodiment, the pre-calibrated LSC parameters as stored in the pre-calibrated LSC parameter memory 14 may be generated beforehand using conventional techniques, and details are omitted for brevity. The LSC circuit 11 of the embodiment may be implemented by conventional techniques. For example, in a mesh-grid scheme, one gain is assigned to each pixel for correcting the corresponding pixel. Due to great amount of memory required in the mesh-grid scheme, fewer grids may be used instead and the gains on the missing grids may be obtained by interpolation. A more economical scheme may utilize a polynomial (e.g., circularly symmetric polynomial or 2D polynomial) to approximate deviation of gain from reference pixels.

Figure 9A:
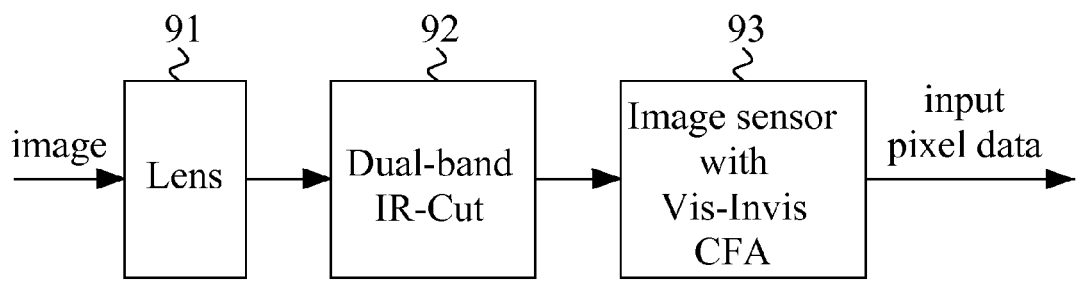
FIG. 9A is a block diagram illustrating an image sensor apparatus according to a second specific embodiment of the present invention.
Figures 9B, 9C:
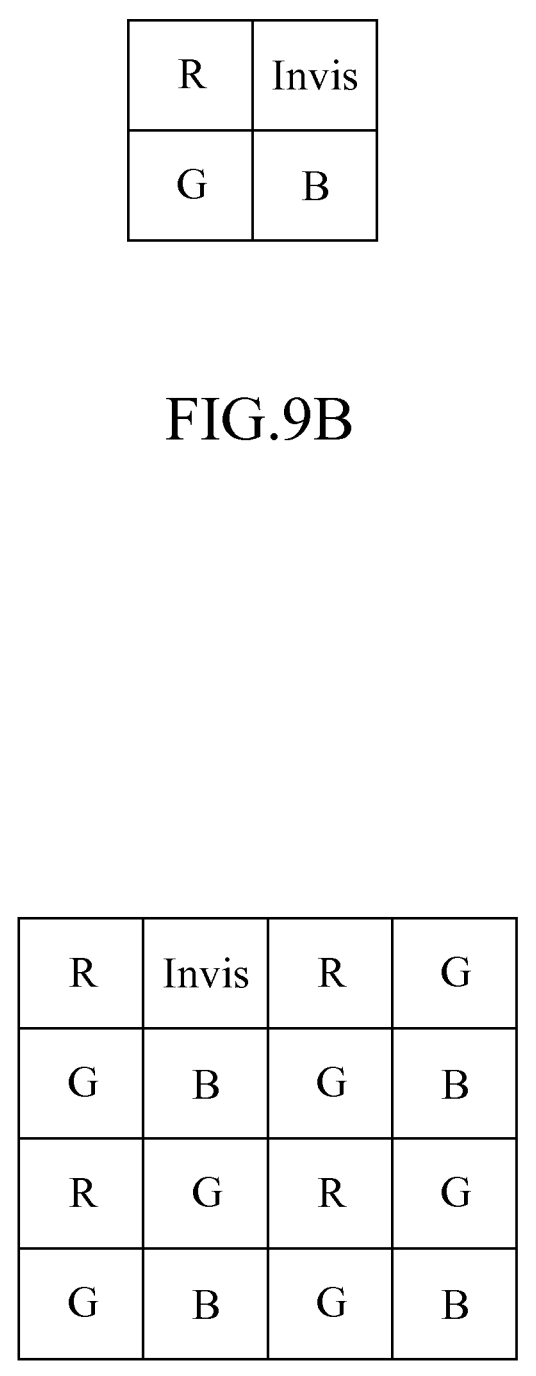

In a second specific embodiment, the input pixel data received by the LSC circuit 11 are provided by an image sensor apparatus 90 illustrated in FIG. 9A. Specifically, a lens 91 is used to perform a process of imaging to form an image upon an image sensor 93 with a color filter array (CFA) composed of plural visible (Vis) filters (e.g., red filter (R), green filter (G) and blue filter (B)) and at least one invisible (Invis) filter (e.g., IR filter or ultraviolet (UV) filter). The image sensor 93 may, for example, be a charge coupled device (CCD) or a complementary metal oxide semiconductor (CMOS) image sensor. FIG. 9B and FIG. 9C shows exemplary CFAs with R filter, G filter, B filter and the invisible (Invis) filter. A dual-band IR-cut device 92 may be optionally disposed between the lens 91 and an image sensor 93.

Figure 10A:
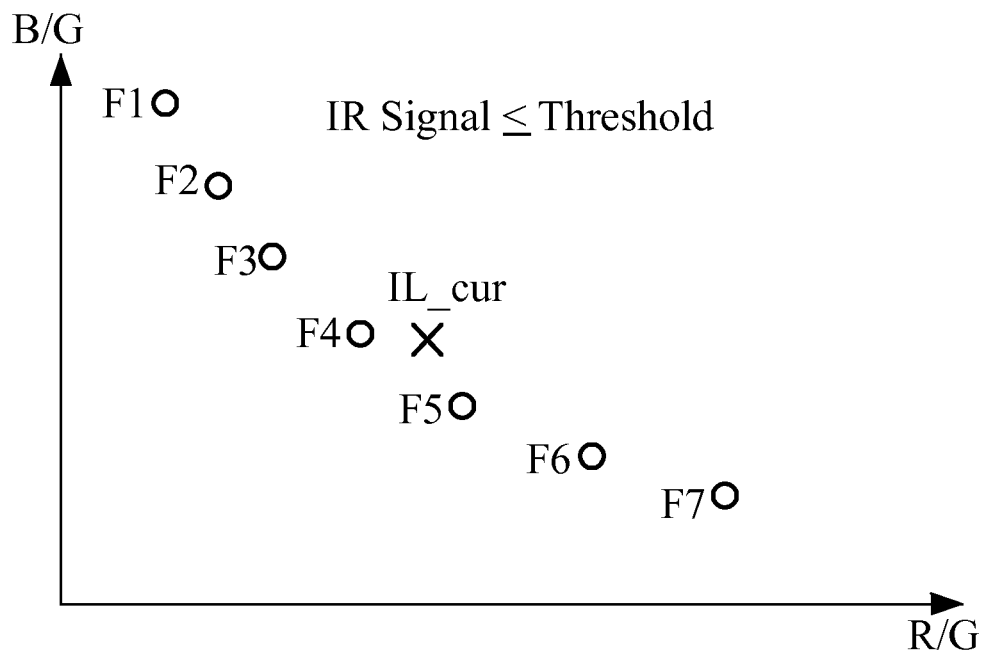
FIG. 10A shows exemplary pre-defined illuminants identified with R/G and B/G color ratios per the second specific embodiment.
Figure 10B:
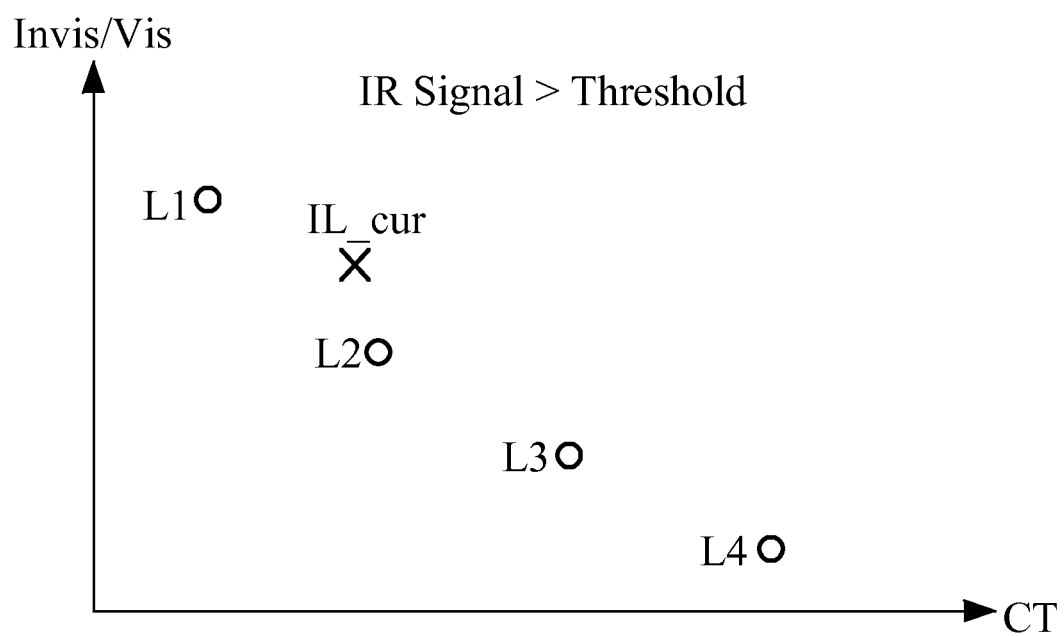
FIG. 10B shows exemplary pre-defined illuminants identified with Invis/Vis and associated color temperature (CT) according to the second specific embodiment.

In the embodiment, in addition to the R/G color ratio and the B/G color ratio, a composite ratio is also calculated in step 22 (FIG. 2). In the specification, the "composite" ratio is a ratio directed or relevant to both invisible and visible channels. The composite ratio of the embodiment may be Invis/Vis, for example, IR_mean/(a1*R_mean+a2*G_mean+a3*B_mean), which is calculated by dividing a mean value of IR channel of the current frame by a weighted sum of mean values of R, G and B channels of the current frame, where a1, a2 and a3 are adjustable weighting parameters. The color ratios and the composite ratio of the pre-defined illuminants may be similarly calculated beforehand using the same image sensor apparatus 90. FIG. 10A shows exemplary pre-defined illuminants F1 to F7 (stored in the illuminant memory 123) identified with R/G and B/G color ratios as their coordinates. FIG. 10B shows exemplary pre-defined illuminants L1 to L4 (also stored in the illuminant memory 123) identified with Invis/Vis (i.e., the composite ratio) and associated color temperature (CT) as their coordinates. A to-be-determined illuminant of the current frame is indicated as IL_current.

Instead of calculating spectral and composite ratios—R/G color ratio, B/G color ratio and Invis/Vis composite difference—in step 22, spectral and composite differences, for example, R-G color difference, B-G color difference and Invis-Vis, may be calculated in step 22. Specifically, the R-G color difference is calculated by subtracting a mean value of G channel of the current frame from a mean value of R channel of the current frame; the B-G color difference is calculated by subtracting a mean value of G channel of the current frame from a mean value of B channel of the current frame; and the Invis-Vis composite difference is calculated by subtracting a weighted sum (i.e., Vis) of mean values of R, G and B channels of the current frame from a mean value (i.e., Invis) of IR channel of the current frame. Generally speaking, spectral association-measurements such as the spectral/composite ratios or spectral/composite differences may be calculated in step 22. Although spectral ratios, color ratios and composite ratios are exemplified in the following embodiments and shown figures, it is appreciated that the claimed invention may be generally adapted to other embodiments that use other spectral measurements of association such as spectral differences, color differences and composite differences.

Figure 11:
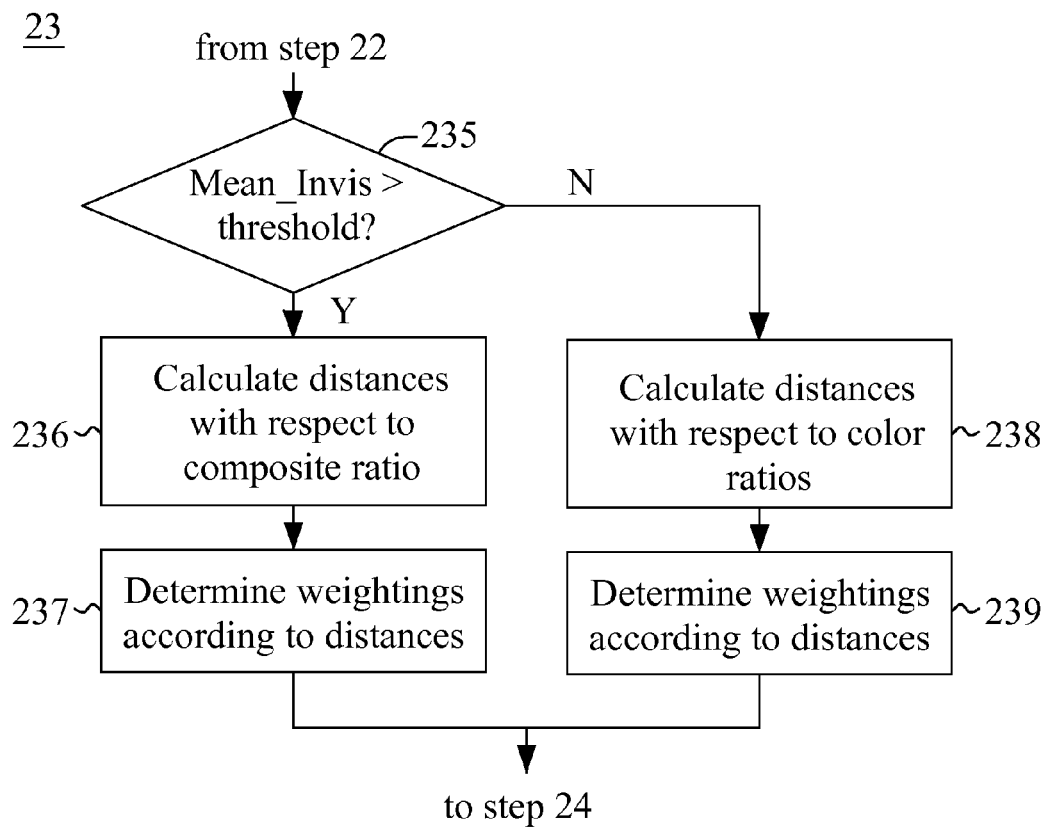
FIG. 11 shows a detailed flow diagram of step 23 of FIG. 2 according to the second specific embodiment.
Figure 12:
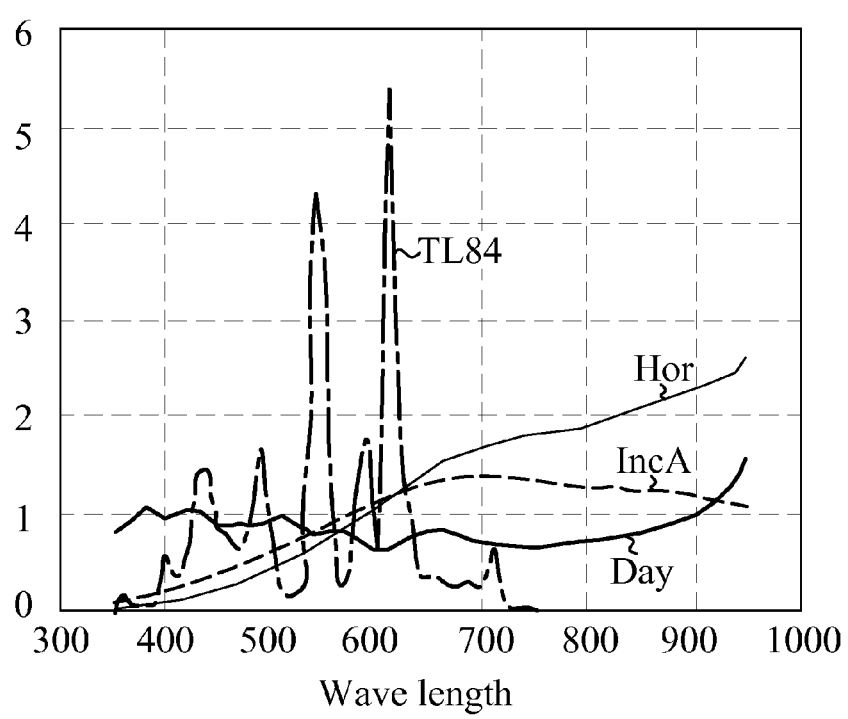
FIG. 12 shows an exemplary spectral distribution of some common light sources.

FIG. 11 shows a detailed flow diagram illustrating step 23 of correlating the calculated ratios with the pre-defined ratios. In step 235, it is determined whether mean value of the invisible (e.g., IR) channel is greater than a predetermined threshold. One of reasons behind using step 235 and the invisible (e.g., IR) filter in the embodiment may be appreciated by observing spectral distribution of some common light sources as exemplified in FIG. 12. As some light sources have respective IR contents, characteristic of which may thus be utilized to distinguish among the a variety of light sources.

If the result of step 235 is positive, distances between the to-be-determined illuminant identified with the calculated composite ratio and neighboring correlated pre-defined illuminants are calculated as exemplified in FIG. 10B (step 236), and the corresponding weightings are then determined according to the calculated distances (step 237). If the result of step 235 is negative, distances between the to-be-determined illuminant identified with the calculated color ratios (e.g., B/G and R/G ratios) and neighboring correlated pre-defined illuminants are calculated as exemplified in FIG. 10A (step 238), and the corresponding weightings are then determined according to the calculated distances (step 239). The correlated pre-defined illuminates and the corresponding weightings of either step 237 or 239 are then received and used by the LSC parameter generator 13 in order to retrieve pre-calibrated LSC parameters from the pre-calibrated LSC parameter memory 14.

In the embodiment, the pre-calibrated LSC parameters may be stored in the pre-calibrated LSC parameter memory 14 in a format as follows:

F1, LSC parameter 1; F2, LSC parameter 2; ... Fn, LSC parameter n (where n is a positive integer)

L1, LSC parameter 1; L2, LSC parameter 2; ... Lm, LSC parameter m (where m is a positive integer, which is not necessarily the same as n).

Although specific embodiments have been illustrated and described, it will be appreciated by those skilled in the art that various modifications may be made without departing from the scope of the present invention, which is intended to be limited solely by the appended claims.

What is claimed is:

1. A lens shading correction (LSC) system, comprising:
an LSC circuit configured to receive input pixel data of a current frame;
an illuminant estimator configured to calculate at least one spectral association-measurement of the current frame according to the input pixel data or output pixel data of the LSC circuit, and then to correlate the at least one calculated spectral association-measurement with spectral association-measurements of a plurality of pre-defined illuminants to determine at least one correlated illuminant;
an LSC parameter generator coupled to receive the at least one correlated illuminant; and
a pre-calibrated LSC parameter memory, from which the LSC parameter generator retrieves at least one set of pre-calibrated LSC parameters;
wherein the LSC parameter generator generates a set of LSC parameters based on the at least one retrieved set of pre-calibrated LSC parameters according to the at least one correlated illuminant, the generated set of LSC parameters being then forwarded to the LSC circuit to correct pixel data of a succeeding frame;
wherein the illuminant estimator comprises:
a spectral association-measurement calculator coupled to receive the input or output pixel data in order to calculate the at least one spectral association-measurement; and
an edge detector disposed in front of the spectral association-measurement calculator and configured to extract on-edge pixel data from the input or output pixel data, the on-edge pixel data being then forwarded to the spectral association-measurement calculator.

2. The LSC system of claim 1, wherein the illuminant estimator comprises:
a correlator configured to receive and correlate the at least one calculated spectral association-measurement; and an illuminant memory configured to store the spectral association-measurements of the plurality of pre-defined illuminants.

3. The LSC system of claim 1, wherein the illuminant estimator further generates correlation weightings corresponding to the pre-defined illuminants to be correlated.

4. The LSC system of claim 3, wherein the LSC parameter generator retrieves a plurality of sets of pre-calibrated LSC parameters, which are blended using the correlation weightings to generate a blended set of LSC parameters as the generated set of LSC parameters.

5. The LSC system of claim 3, wherein the LSC parameter generator retrieves a plurality of sets of pre-calibrated LSC parameters, and the set of LSC parameters with highest weighting is selected as the generated set of LSC parameters.

6. The LSC system of claim 1, wherein the at least one correlated illuminant comprises a light type and a color temperature.

7. The LSC system of claim 3, wherein the input pixel data received by the LSC circuit are provided by an image sensor apparatus comprising:
 a lens used to form an image; and
 an image sensor, upon which the image irradiates, the image sensor being covered with a color filter array (CFA);
 wherein color channels outputted from the image sensor have infrared (IR) contents.

8. A lens shading correction (LSC) system, comprising:
 an LSC circuit configured to receive input pixel data of a current frame;
 an illuminant estimator configured to calculate at least one spectral association-measurement of the current frame according to the input pixel data or output pixel data of the LSC circuit, and then to correlate the at least one calculated spectral association-measurement with spectral association-measurements of a plurality of pre-defined illuminants to determine at least one correlated illuminant;
 an LSC parameter generator coupled to receive the at least one correlated illuminant; and
 a pre-calibrated LSC parameter memory, from which the LSC parameter generator retrieves at least one set of pre-calibrated LSC parameters;
 wherein the LSC parameter generator generates a set of LSC parameters based on the at least one retrieved set of pre-calibrated LSC parameters according to the at least one correlated illuminant, the generated set of LSC parameters being then forwarded to the LSC circuit to correct pixel data of a succeeding frame;
 wherein the illuminant estimator further generates correlation weightings corresponding to the pre-defined illuminants to be correlated;
 wherein the input pixel data received by the LSC circuit are provided by an image sensor apparatus comprising:
 a lens used to form an image; and
 an image sensor, upon which the image irradiates, the image sensor being covered with a color filter array (CFA);
 wherein color channels outputted from the image sensor have infrared (IR) contents;
 wherein the image sensor apparatus further comprises a dual-band IR-cut device disposed between the lens and the image sensor.

9. The LSC system of claim 7, wherein the at least one spectral association-measurement of the current frame comprises an R/G color ratio and a B/G color ratio, wherein the R/G color ratio is calculated by dividing a mean value of read (R) channel of the current frame by a mean value of green (G) channel of the current frame, and the B/G color ratio is calculated by dividing a mean value of blue (B) channel of the current frame by the mean value of G channel of the current frame.

10. A lens shading correction (LSC) system, comprising:
 an LSC circuit configured to receive input pixel data of a current frame;
 an illuminant estimator configured to calculate at least one spectral association-measurement of the current frame according to the input pixel data or output pixel data of the LSC circuit, and then to correlate the at least one calculated spectral association-measurement with spectral association-measurements of a plurality of pre-defined illuminants to determine at least one correlated illuminant;
 an LSC parameter generator coupled to receive the at least one correlated illuminant; and
 a pre-calibrated LSC parameter memory, from which the LSC parameter generator retrieves at least one set of pre-calibrated LSC parameters;
 wherein the LSC parameter generator generates a set of LSC parameters based on the at least one retrieved set of pre-calibrated LSC parameters according to the at least one correlated illuminant, the generated set of LSC parameters being then forwarded to the LSC circuit to correct pixel data of a succeeding frame;
 wherein the illuminant estimator further generates correlation weightings corresponding to the pre-defined illuminants to be correlated;
 wherein the input pixel data received by the LSC circuit are provided by an image sensor apparatus comprising:
 a lens used to form an image; and
 an image sensor, upon which the image irradiates, the image sensor being covered with a color filter array (CFA);
 wherein color channels outputted from the image sensor have infrared (IR) contents;
 wherein the at least one spectral association-measurement of the current frame comprises an R/G color ratio and a B/G color ratio, wherein the R/G color ratio is calculated by dividing a mean value of read (R) channel of the current frame by a mean value of green (G) channel of the current frame, and the B/G color ratio is calculated by dividing a mean value of blue (B) channel of the current frame by the mean value of G channel of the current frame;
 wherein the illuminant estimator performs correlation with the following steps:
 classifying the plurality of pre-defined illuminants into a plurality of categories;
 determining whether the calculated color ratios belong to a single category among the classified categories;
 if the calculated color ratios belong to a single category, determining an associated color temperature, which is then received and used by the LSC parameter generator in order to retrieve one set of pre-calibrated LSC parameters; and
 if the calculated color ratios do not belong to a single category, calculating distances between a to-be-determined illuminant identified with the calculated color ratios and neighboring correlated pre-defined illuminants, and determining the corresponding correlation weightings according to the calculated distances.

11. A lens shading correction (LSC) system, comprising:
 an LSC circuit configured to receive input pixel data of a current frame;

an illuminant estimator configured to calculate at least one spectral association-measurement of the current frame according to the input pixel data or output pixel data of the LSC circuit, and then to correlate the at least one calculated spectral association-measurement with spectral association-measurements of a plurality of pre-defined illuminants to determine at least one correlated illuminant;

an LSC parameter generator coupled to receive the at least one correlated illuminant; and a pre-calibrated LSC parameter memory, from which the LSC parameter generator retrieves at least one set of pre-calibrated LSC parameters;

wherein the LSC parameter generator generates a set of LSC parameters based on the at least one retrieved set of pre-calibrated LSC parameters according to the at least one correlated illuminant, the generated set of LSC parameters being then forwarded to the LSC circuit to correct pixel data of a succeeding frame;

wherein the illuminant estimator further generates correlation weightings corresponding to the pre-defined illuminants to be correlated;

wherein the input pixel data received by the LSC circuit are provided by an image sensor apparatus comprising:

a lens used to form an image; and an image sensor, upon which the image irradiates, the image sensor being covered with a color filter array (CFA);

wherein color channels outputted from the image sensor have infrared (IR) contents;

wherein the at least one spectral association-measurement of the current frame comprises an R-G color difference and a B-G color difference, wherein the R-G color difference is calculated by subtracting a mean value of green (G) channel of the current frame from a mean value of read (R) channel of the current frame, and the B-G color difference is calculated by subtracting the mean value of G channel of the current frame from a mean value of blue (B) channel of the current frame.

12. The LSC system of claim 11, wherein the illuminant estimator performs correlation with the following steps:

classifying the plurality of pre-defined illuminants into a plurality of categories;

determining whether the calculated color differences belong to a single category among the classified categories;

if the calculated color differences belong to a single category, determining an associated color temperature, which is then received and used by the LSC parameter generator in order to retrieve one set of pre-calibrated LSC parameters; and if the calculated color ratios do not belong to a single category, calculating distances between a to-be-determined illuminant identified with the calculated color differences and neighboring correlated pre-defined illuminants, and determining the corresponding correlation weightings according to the calculated distances.

13. A lens shading correction (LSC) system, comprising:

an LSC circuit configured to receive input pixel data of a current frame;

an illuminant estimator configured to calculate at least one spectral association-measurement of the current frame according to the input pixel data or output pixel data of the LSC circuit, and then to correlate the at least one calculated spectral association-measurement with spectral association-measurements of a plurality of pre-defined illuminants to determine at least one correlated illuminant;

an LSC parameter generator coupled to receive the at least one correlated illuminant; and a pre-calibrated LSC parameter memory, from which the LSC parameter generator retrieves at least one set of pre-calibrated LSC parameters;

wherein the LSC parameter generator generates a set of LSC parameters based on the at least one retrieved set of pre-calibrated LSC parameters according to the at least one correlated illuminant, the generated set of LSC parameters being then forwarded to the LSC circuit to correct pixel data of a succeeding frame;

wherein the illuminant estimator further generates correlation weightings corresponding to the pre-defined illuminants to be correlated;

wherein the input pixel data received by the LSC circuit are provided by an image sensor apparatus comprising:

a lens used to form an image; and an image sensor, upon which the image irradiates, the image sensor being covered with a color filter array (CFA);

wherein the CFA is composed of plural visible filters and at least one invisible filter.

14. The LSC system of claim 13, wherein the at least one spectral association-measurement of the current frame comprises:

an R/G color ratio and a B/G color ratio, the R/G color ratio being calculated by dividing a mean value of read (R) channel of the current frame by a mean value of green (G) channel of the current frame, and the B/G color ratio being calculated by dividing a mean value of blue (B) channel of the current frame by the mean value of G channel of the current frame; and a composite ratio invisible_mean/(a1*R_mean+a2*G_mean+a3*B_mean), which is calculated by dividing a mean value of invisible channel of the current frame by a weighted sum of mean values of R, G and B channels of the current frame, where a1, a2 and a3 are adjustable weighting parameters.

15. The LSC system of claim 14, wherein the illuminant estimator performs correlation with the following steps:

determining whether the mean value of the invisible channel is greater than a predetermined threshold;

if the mean value of the invisible channel is greater than the predetermined threshold, calculating distances between a to-be-determined illuminant identified with the calculated composite ratio and neighboring correlated pre-defined illuminants, and then determining the corresponding correlation weightings according to the calculated distances; and if the mean value of the invisible channel is not greater than the predetermined threshold, calculating distances between the to-be-determined illuminant identified with the calculated color ratios and neighboring correlated pre-defined illuminants, and then determining the corresponding correlation weightings according to the calculated distances.

16. The LSC system of claim 13, wherein the at least one spectral association-measurement of the current frame comprises:

an R-G color difference and a B-G color difference, the R-G color difference being calculated by subtracting a mean value of green (G) channel of the current frame from a mean value of read (R) channel of the current frame, and the B-G color difference being calculated by subtracting the mean value of G channel of the current frame from a mean value of blue (B) channel of the current frame; and a composite difference invisible_mean−(a1*R_mean+a2*G_mean+a3*B_mean), which is calculated by subtracting a weighted sum of mean values of R, G and B channels of the current frame from a mean value of invisible channel of the current frame, where a1, a2 and a3 are adjustable weighting parameters.

17. The LSC system of claim 16, wherein the illuminant estimator performs correlation with the following steps:

determining whether the mean value of the invisible channel is greater than a predetermined threshold;

if the mean value of the invisible channel is greater than the predetermined threshold, calculating distances between a to-be-determined illuminant identified with the calculated composite difference and neighboring correlated pre-defined illuminants, and then determining the corresponding correlation weightings according to the calculated distances; and if the mean value of the invisible channel is not greater than the predetermined threshold, calculating distances between the to-be-determined illuminant identified with the calculated color differences and neighboring correlated pre-defined illuminants, and then determining the corresponding correlation weightings according to the calculated distances.

\* \* \* \* \*